United States Patent [19]
Lashmett et al.

[11] Patent Number: 5,589,004
[45] Date of Patent: Dec. 31, 1996

[54] METHOD FOR REMEDIATING CONTAMINATED MATERIAL

[75] Inventors: Brent J. Lashmett, Embarrass; Doug C. Lashmett; H. W. Lashmett, both of Babbitt; Larry R. Herzog, Mt. Iron; Thomas P. Tri, Duluth; Merideth L. Karpik, Eveleth, all of Minn.

[73] Assignee: B&S Research, Inc., Embarrass, Minn.

[21] Appl. No.: 450,140

[22] Filed: May 26, 1995

Related U.S. Application Data

[62] Division of Ser. No. 283,611, Aug. 1, 1994, Pat. No. 5,492,139.

[51] Int. Cl.$^6$ .............................. B08B 7/04; C02F 3/02
[52] U.S. Cl. .............................. 134/10; 134/25.1; 134/40; 210/608; 435/264
[58] Field of Search .................... 134/10.1, 25, 25.3, 134/25.4, 33, 40, 111, 102.1, 105, 188; 210/608; 435/264

[56] References Cited

U.S. PATENT DOCUMENTS

| | | | |
|---|---|---|---|
| 1,826,015 | 10/1931 | Morton | 134/111 |
| 2,141,713 | 12/1938 | Hensler et al. | 134/33 X |
| 3,456,659 | 7/1969 | Tiby | 134/33 X |
| 4,282,256 | 8/1981 | Evich et al. | 426/7 |
| 5,217,616 | 6/1993 | Sanyal et al. | 210/617 |
| 5,268,035 | 12/1993 | Neubauer et al. | 134/25.4 X |
| 5,322,078 | 6/1994 | Tuttle | 134/104.4 |
| 5,451,320 | 9/1995 | Wang et al. | 210/604 |
| 5,487,907 | 1/1996 | Drown et al. | 134/25.3 X |

FOREIGN PATENT DOCUMENTS

| | | |
|---|---|---|
| 0309432A3 | 3/1989 | European Pat. Off. . |
| WO92/16314 | 10/1992 | Sweden . |

*Primary Examiner*—Jill Warden
*Assistant Examiner*—Saeed Chaudhry
*Attorney, Agent, or Firm*—Zarley, McKee, Thomte, Voorhees, & Sease

[57] ABSTRACT

A method for removing a contaminating material from a combination material containing the contaminating material and reusable material includes placing the combination material in a tank having cleaning fluid therein capable of separating the contaminating material from the reusable material, the cleaning fluid containing oxygen consuming microorganisms capable of also consuming at least a portion of the contaminating material; circulating oxygen through the cleaning fluid so as to provide oxygen for consumption by the microorganisms; circulating the cleaning fluid around the combination material within the tank whereby cleaning fluid will cause the contaminating material to separate from the reusable material and will cause at least some of the contaminating material to float on the top surface of the cleaning fluid within the tank; drawing off the contaminating material which is floating on the top surface of the cleaning fluid and removing it from the tank; and recirculating the cleaning fluid through the tank through an outlet opening therein which is remote from and lower than the skimming opening.

12 Claims, 3 Drawing Sheets

METHOD FOR REMEDIATING CONTAMINATED MATERIAL

This is a divisional of application Ser. No. 08/283,611 filed on Aug. 1, 1994, U.S. Pat. No. 5,492,139.

BACKGROUND OF THE INVENTION

The present invention relates to a method and apparatus for remediating contaminated material.

Many materials and objects exposed to oil, PCB, and other hydrocarbon contaminates can be reused if an appropriate cleaning process is provided. As used herein, the term "contaminated materials" can include any material contaminated by the above contaminates, whether that material be granulated (such as floor dry materials or sweeping compounds), mats, rubber beads, air filters for waste centers, used oil filters, or any other material or object which during use is capable of absorbing contaminates.

Cleaning fluids are available which contain various chemicals, emulsifiers, and other cleaning agents which are capable of separating the hydrocarbon contaminates from the objects or materials to be cleaned. Agents also are known which contain microorganisms capable of consuming the contaminates.

However, there is a need for equipment and for a method of operating the equipment which provides satisfactory use of these various cleaning agents to remove the contaminates from the reusable materials so that the reusable materials can be recycled.

Therefore a primary object of the present invention is the provision of an improved method and apparatus for remediating contaminated material.

A further object of the present invention is the provision of a method and apparatus which will permit the remediating of various contaminated materials or objects of various shapes and sizes.

A further object of the present invention is the provision of a method and apparatus for collecting the contaminates after they have been removed from the reusable materials.

A further object of the present invention is the provision of an apparatus and method which are efficient in operation, durable in use, and economical to manufacture.

SUMMARY OF THE INVENTION

The method of the present invention removes a contaminated material from a combination material containing the contaminating material and a reusable material. The method comprises placing the combination material in a tank having a cleaning fluid therein capable of separating the contaminating material from the reusable material. The cleaning fluid is circulated around the combination material within the tank so that the cleaning fluid will cause the contaminating material to separate from the reusable material and will cause at least some of the contaminating material to float on the top surface of the cleaning fluid within the tank. The method further comprises drawing off the contaminated material which is floating on the top surface of the cleaning fluid and removing it from the tank.

The apparatus of the present invention includes a tank having a plurality of side walls and a bottom wall enclosing a cleaning chamber for containing the cleaning fluid. A skimming opening is provided in one of the side walls of the tank and is positioned a first distance above the bottom wall. The skimming opening provides fluid communication from within the cleaning chamber to outside the cleaning chamber. A fluid circulation manifold is positioned adjacent the bottom wall of the tank within the cleaning chamber. The manifold has a plurality of spray openings therein for introducing fluid into the cleaning chamber. A fluid outlet opening is provided in one of the side walls and bottom wall and is connected to a recirculation pump by means of a conduit system. The conduit system connects the fluid outlet opening to the recirculation pump and connects the recirculation pump to the fluid circulation manifold. The pump then causes the cleaning fluid within the tank to be circulated from the outlet opening, to the pump and from the pump to the manifold where the fluid is recirculated into the cleaning chamber through the spray holes in the manifold. A contaminant container is positioned outside the fluid chamber and in fluid communication with the skimming opening for receiving the contaminating material which exits through the skimming opening in the tank wall.

DETAILED DESCRIPTION OF THE DRAWINGS

Figure 1:
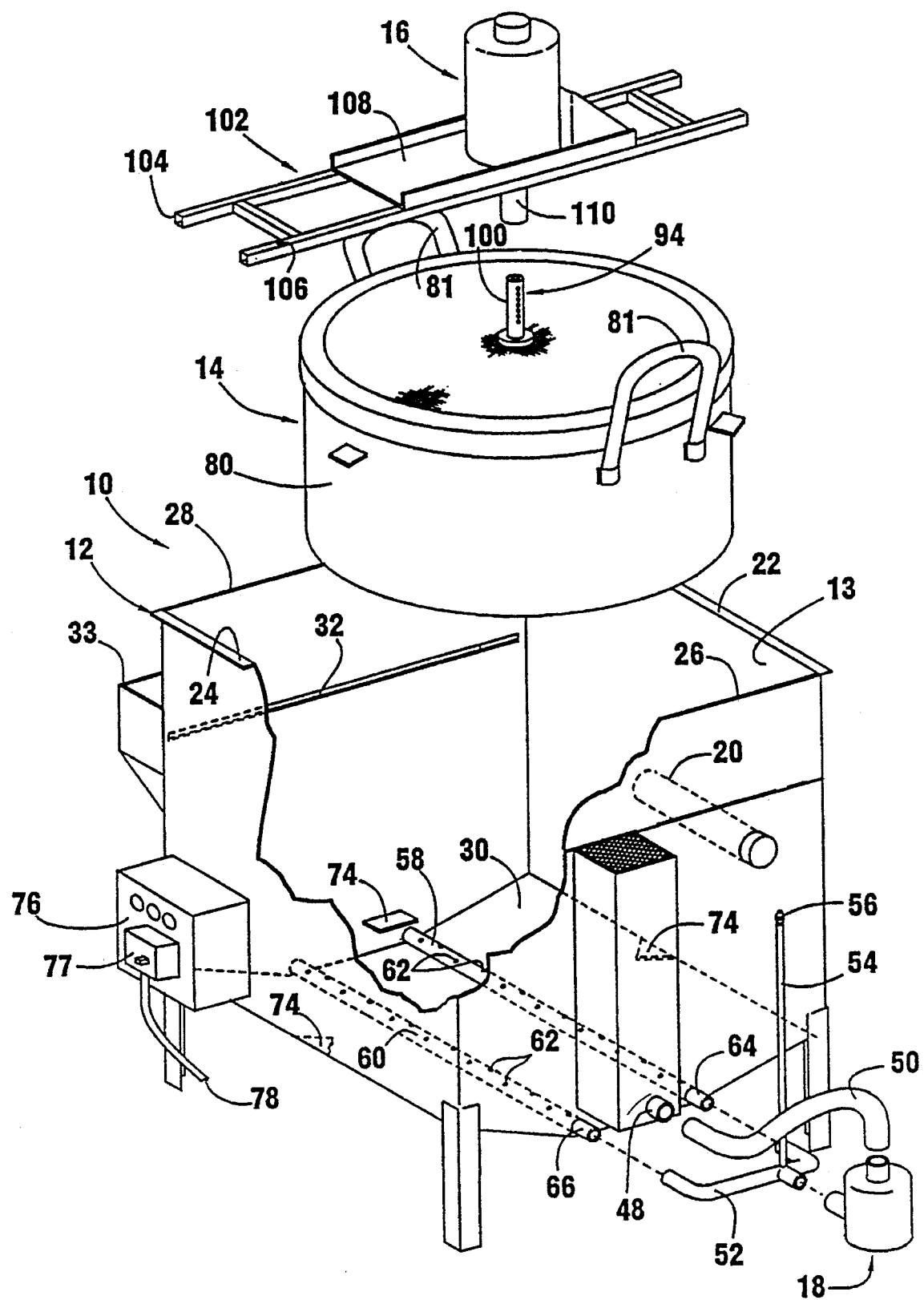
FIG. 1 is an exploded pictorial view of the apparatus of the present invention.
Figure 2:
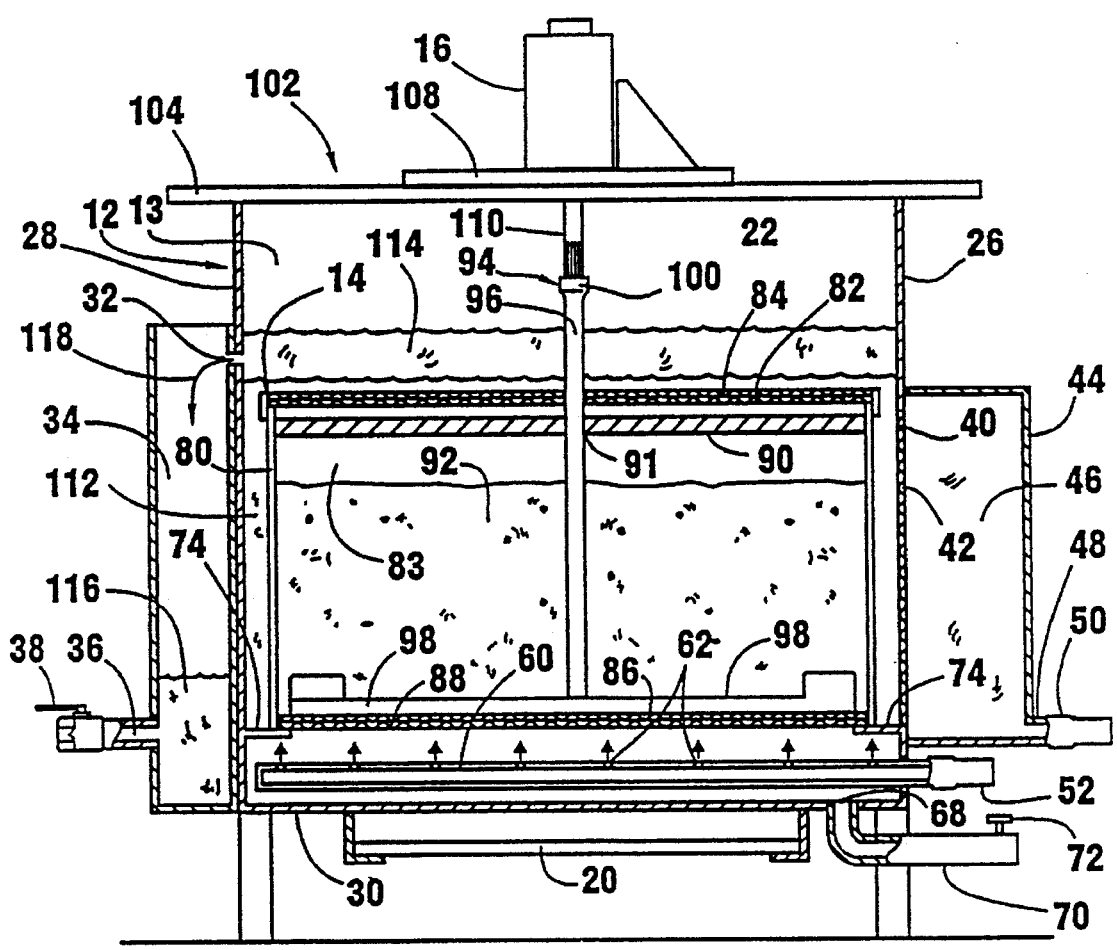
FIG. 2 is a sectional view of the apparatus of FIG. 1.

Referring to the drawings, the numeral 10 generally designates a cleaning apparatus of the present invention. Apparatus 10 includes a tank 12 having a cleaning chamber 13 therein. A basket 14 is adapted to be placed within the cleaning chamber 13, and an agitator motor 16 is adapted to be fitted over and agitator (to be described hereinafter) within the basket 14. Apparatus 10 also includes a recirculating pump 18 and an electrical heating element 20. A gas heater may also be used instead of an electrical heating element 20.

Tank 12 includes two side walls 22, 24 two end walls 26, 28 and a bottom wall 30. An elongated horizontal skimming slot 32 is provided in end wall 28. Outside end wall 28 is a skimming container 33 having a skimming chamber 34 which in fluid communication with the skimming slot 32. Skimming chamber 34 includes at its lower end an outlet 36 having a valve 38 which may be opened or closed to remove the contents of the skimming chamber 34.

The end wall 26 includes a rectangular outlet opening 40 therein which is covered with a filter 42 so as to permit fluid within the cleaning chamber 13 to pass through the outlet opening 40, with the filter 42 filtering out any materials in the fluid.

A recirculating housing 44 is mounted outside end wall 26 and forms a recirculating chamber 46 which is in communication with and outside the outlet opening 40 in wall 26. At the lower end of recirculating chamber 46 is a conduit connection 48 which is adapted to be connected to a pump inlet conduit 50. Pump inlet conduit 50 is connected to the inlet of pump 18, and a Y shaped pump outlet conduit 52 is connected to the outlet of pump 18. An air stand pipe 54 having an air nipple 56 on the upper end thereof is connected to and in communication with the Y shaped pump outlet conduit 52.

Within the cleaning chamber 13 of tank 12, and extending in parallel relation to one another along the bottom wall 30 thereof, are a pair of recirculation pipes or manifolds 58, 60 each of which include a plurality of spray holes 62 therein. Manifolds 58, 60 include pipe connections 64, 66 respectively which extend through the end wall 26 of the tank 12 and which are connected to the two Y ends of the pump outlet conduit 52.

Bottom wall 30 of the tank 12 includes a drain hole 68 which is connected to a drain pipe 70 having a valve 72 therein for draining the contents of cleaning chamber 30. Mounted within the cleaning chamber 13 and extending inwardly from each of the side walls 22, 24 and the ends walls 26, 28 are a plurality of support flanges 74. Flanges 74 are spaced approximately four inches above the bottom wall 30 and are intended to provide support for the basket 14 when the basket 14 is placed within the cleaning chamber 13.

A control 76 is an electrical box containing a master switch 77 and several switches and timeres which are connected by a control cable 78 to motors 16, 18 and heating element 20. Heating element 20 is located inside washing chamber 13 and is attached to sidewall 26.

Basket 14 includes a cylindrical basket wall 80 having a pair of lifting hooks 81 connected thereto. The top wall of basket 14 is provided by a first screen 82 and a second screen 84. These two screens are of two different sized mesh and intended to provide fluid communication into a basket compartment 83 within basket 14. The bottom wall of the basket 14 is provided by first and second screens 86, 88 which are similar to screens 82, 84. A support bar 90 extends diametrically across the upper end of the basket 14 and includes a shaft opening 91 therein. Basket 14 is intended to contain contaminated material 92 which may be granulated material or objects having various shapes and sizes.

An agitator 94 includes a vertical agitator shaft 96 having a horizontal agitator head 98 secured to its lower end and having a splined receptacle 100 at its upper end.

Motor 16 is supported by a motor support frame 102 having a pair of parallel elongated bars 104, 106 which are joined by a web plate 108. Motor 16 includes a downwardly extending splined motor shaft 110 which is adapted to mate within the splined receptacle 100 so as to provide driving connection between the motor 16 and the agitator 94.

In operation, the cleaning chamber 13 is filled with a washing or cleaning fluid 112. Numerous cleaning fluids are known in the art for removing and separating petrol chemical products from objects to be cleaned. A preferred cleaning material for use in the present invention is as follows:

| Percentage By Volume | Ingredient Description |
| --- | --- |
| 16% | Alcohol |
| 70% | Water (deionized or distilled) |
| 10% | An emulsifier manufactured by CRC Laboratories, Inc., 706 South Seventh Street, Delano, Minnesota and sold under the trademark CLEAN-WISE. |
| 1/2% | Nutrients selected from phosphorus, nitorgen, sulfer, lime and/or potassium. |
| 1% | A cultured bacterial material containing microorganisms for consuming petro chemical products, sold by B&S Research, Inc., 4345 Hwy. 21, Embarrass, MN 55732 under the trade designation B & S Industrial. |
| 2 1/2% | A catalyst for use with the above cultured bacteria material and sold by B&S Research, Inc., 4345 Hwy. 21, Embarrass, MN 55732 under the trade designation B & S Industrial Achieve. |

Other cleaning fluids may be used without detracting from the invention.

The material or objects to be cleaned are placed within the basket 14 and the basket 14 is placed within the cleaning chamber 13 so that it rests upon the flanges 74 in spaced relation above the recirculation manifolds 58, 60. The heater 20 is activated to cause the fluid within the tank to be heated to the appropriate temperature for causing the maximum vitality and activity of the microorganisms within the fluid. The preferred range of temperature for the fluid should be between 80° and 100° F., and the preferred temperature is approximately 90° F.

The pump 18 is then activated which causes fluid to be drawn from recirculating chamber 46 into the pump and forced outwardly through the spray holes 62 in the manifolds 58, 60. This causes the fluid within the chamber 13 to be circulated and bubbled around and through the materials 92 within the basket 14 thereby exposing the materials 92 to the maximum amount of fluid and microorganisms as possible. As the petrochemicals or oils are separated from the materials to be cleaned, an oil or contaminant layer 114 forms on the top surface of the cleaning fluid. The level of the cleaning fluid is kept adjacent to the skimming slot 32 so that as oil or other contaminants form on the top of the cleaning fluid they are skinned off through the skimming slot 32 and into the skimming chamber 34. This causes a contaminant reservoir 116 to accumulate within the skimming chamber 34.

The microorganisms contained within the cleaning fluid 112 are aerobic microorganisms which require oxygen. Therefore in order to facilitate the functioning of the microorganisms, the air nipple 56 of stand pipe 54 is connected to a source of pressurized air or oxygen and oxygen is introduced into the pump outlet conduit 52 so as to become disbursed within the fluid being delivered to the two recirculation manifolds 58, 60. Thus as the fluid circulates out through the spray holes 62 into the cleaning chamber 13, air or oxygen is also introduced into the fluid within the chamber 13, and this air or oxygen helps to sustain the microorganisms within the cleaning fluid.

Figure 3:
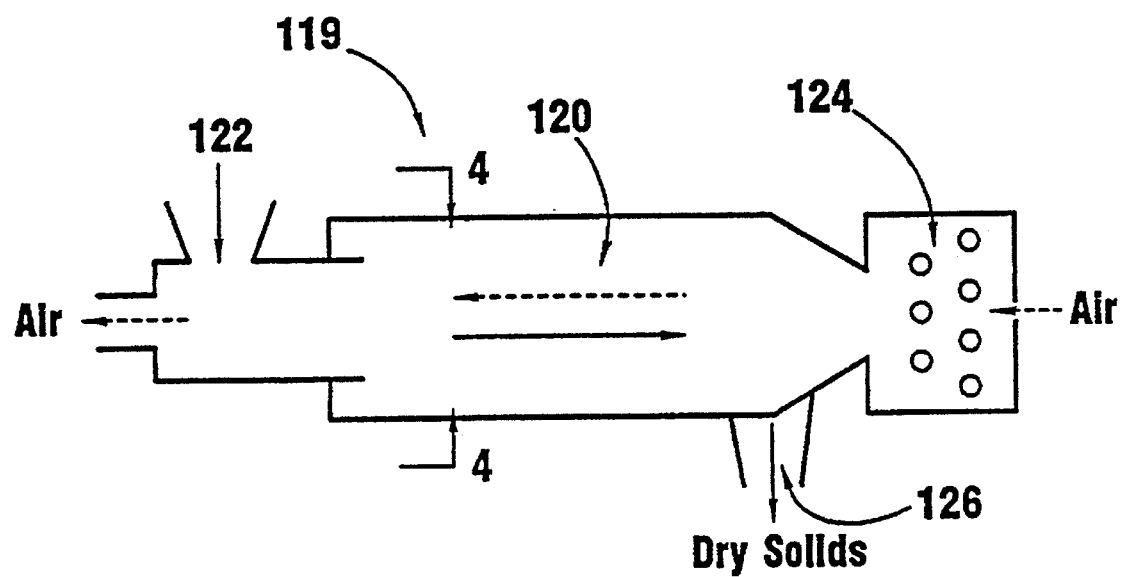
FIG. 3 is a schematic view of a rotary dryer for drying the reusable material after it has been cleaned.

When the materials within the basket 14 have been sufficiently cleaned, the basket is removed from the cleaning chamber 13 and the contents 92 are placed within a dryer such as the rotary dryer 119 shown in FIG. 3. Dryer 119 includes a heating drum 120 having a feed hopper 122 at one end and having heating coils 124 at the opposite ends. Air is introduced in the direction shown by the arrows in FIG. 3, but it flows in a direction opposite to the flow of the reusable material 128 within the drum 120. The drum 120 includes a plurality of fins 130 which grab the material 128 and cause it to tumble within the rotating drum 120. The drum is preferably tilted so as to cause the material 128 to progress from hopper 122 toward a outlet opening 126 at the opposite end of the dryer. The material exits outlet 126 it is dried and ready for reuse.

Figure 4:
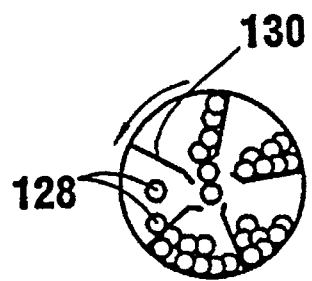
FIG. 4 is a sectional view taken along line 4—4 of FIG. 3.

While the particular drying process shown in FIGS. 3 and 4 may be used for granulated materials, other drying methods may be used without detracting from the invention. Also some objects are not amenable to being dried within a rotating dryer, and in such cases other drying methods may be used.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A method for removing a contaminating material from a combination material containing said contaminating material and a reusable material, said method comprising:

placing said combination material in a tank having a cleaning fluid therein capable of separating said contaminating material from said reusable material;

said cleaning fluid containing oxygen consuming microorganisms capable of also consuming at least a portion of said contaminating material;

circulating oxygen through said cleaning fluid so as to provide oxygen for consumption by said microorganisms;

circulating said cleaning fluid around said combination material within said tank whereby said cleaning fluid will cause said contaminating material to separate from said reusable material and will cause at least some portion of said contaminating material to float on the top surface of said cleaning fluid within said tank;

drawing off said contaminating material which is floating on said top surface of said cleaning fluid and removing it from said tank through a skinning opening in said tank;

recirculating said cleaning fluid through said tank through an outlet opening therein which is remote from and lower than the skimming opening.

2. A method according to claim 1 wherein said step of circulating said cleaning fluid comprises introducing said cleaning fluid into said tank through holes spaced along the length of a circulation pipe positioned adjacent the bottom of said tank.

3. A method according to claim 1 and further comprising agitating said combination material within said tank so as to maximize contact between said cleaning fluid and said combination material.

4. A method according to claim 1 and further comprising removing said reusable material from said tank after said contaminating material has been removed from said combination material and drying said reusable material.

5. A method according to claim 1 and further comprising placing said combination material in a container having a screened opening therein and submerging said container with said combination material therein below said top surface of said cleaning fluid within said tank.

6. A method according to claim 5 and further comprising agitating said combination material within said container while said container is submerged below said top surface of said cleaning fluid within said tank.

7. A method according to claim 6 and further comprising agitating said combination material within said container by rotating a mixing member within said container.

8. A method according to claim 1 and further comprising heating said cleaning fluid to a temperature which is ideal for the vitality of said microorganisms.

9. A method according to claim 1 wherein said contaminating material comprises oil.

10. A method according to claim 1 wherein said contaminating material is drawn off the top surface of said cleaning fluid and removed from said tank without bringing a substantial amount of said cleaning fluid therewith.

11. The method of claim 1 wherein the reusable material is a non-liquid material.

12. A method for removing a contaminating material from a combination material containing said contaminating material and a reusable material, comprising:

providing a cleaning tank having an inlet opening therein, an outlet opening therein located above said inlet opening, and a skimming opening therein located above and remote from said outlet opening;

providing a cleaning fluid capable of separating said contaminating material from said reusable material, said cleaning fluid containing oxygen consuming microorganisms capable of also consuming at least a portion of said contaminating material;

filling said tank with said cleaning fluid through said inlet opening until said cleaning fluid has a top surface which reaches said skimming opening;

placing said combination material in said cleaning fluid in said tank;

circulating oxygen through said cleaning fluid so as to provide oxygen for consumption by said microorganisms;

circulating said cleaning fluid around said combination material within said tank whereby said cleaning fluid will cause said contaminating material to separate from said reusable material and will cause at least some portion of said contaminating material to float on the top surface of said cleaning fluid within said tank;

drawing off said contaminating material which is floating on said top surface of said cleaning fluid and removing it from said tank through said skimming opening; and recirculating said cleaning fluid through said outlet opening to said inlet opening without passing through said skimming opening.

* * * * *